(12) United States Patent
VanOsdol

(10) Patent No.: US 6,981,516 B1
(45) Date of Patent: Jan. 3, 2006

(54) FAIL SAVE SHUT OFF VALVE FOR FILTERING SYSTEMS EMPLOYING CANDLE FILTERS

(75) Inventor: John VanOsdol, Fairmont, WV (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 10/263,279

(22) Filed: Sep. 24, 2002

(51) Int. Cl.
*F16K 15/04* (2006.01)
*B01D 46/00* (2006.01)

(52) U.S. Cl. ............... 137/519.5; 137/260; 137/493.9; 137/513.5; 137/550; 251/284

(58) Field of Classification Search ............... 137/517, 137/519, 519.5, 513.3, 513.5, 544, 549, 550, 137/460, 493, 493.9; 55/410, 417; 251/284
See application file for complete search history.

(56) References Cited

U.S. PATENT DOCUMENTS

| | | | | |
|---|---|---|---|---|
| 2,390,749 A * | 12/1945 | Swift ...................... 137/519.5 |
| 3,279,545 A * | 10/1966 | Page, Jr. .................... 166/329 |
| 3,367,362 A * | 2/1968 | Hoffman .................... 137/517 |
| 3,437,065 A * | 4/1969 | Robbins, Jr. ............... 114/330 |
| 3,710,822 A * | 1/1973 | Lyda .......................... 137/549 |
| 3,766,940 A * | 10/1973 | Mason ....................... 137/460 |
| 3,830,252 A * | 8/1974 | Follett ..................... 137/519.5 |
| 3,861,414 A * | 1/1975 | Peterson, II ............. 137/512.3 |
| 4,010,770 A | 3/1977 | Peters |
| 4,269,223 A | 5/1981 | Carter et al. |
| 4,590,962 A * | 5/1986 | Tespa ........................ 137/496 |
| 4,830,046 A | 5/1989 | Holt |
| 5,107,890 A | 4/1992 | Gute |
| 5,361,877 A * | 11/1994 | Graham ..................... 188/170 |
| 5,433,771 A * | 7/1995 | Bachovchin et al. ......... 95/280 |
| 5,904,178 A * | 5/1999 | Bracey et al. .......... 137/505.42 |
| 5,961,700 A * | 10/1999 | Oliver ......................... 96/158 |
| 6,202,678 B1 * | 3/2001 | Hawkins ..................... 137/460 |
| 2002/0014156 A1 * | 2/2002 | Leibold et al. ............... 95/280 |

* cited by examiner

*Primary Examiner*—Ramesh Krishnamurthy
(74) *Attorney, Agent, or Firm*—Brian J. Lally; Daniel D. Park; Paul A. Gottlieb

(57) ABSTRACT

The invention relates to an apparatus that acts as a fail save shut off valve. More specifically, the invention relates to a fail save shut off valve that allows fluid flow during normal operational conditions, but prevents the flow of fluids in the event of system failure upstream that causes over-pressurization. The present invention is particularly well suited for use in conjunction with hot gas filtering systems, which utilize ceramic candle filters. Used in such a hot gas system the present invention stops the flow of hot gas and prevents any particulate laden gas from entering the clean side of the system.

8 Claims, 3 Drawing Sheets

US 6,981,516 B1

FAIL SAVE SHUT OFF VALVE FOR FILTERING SYSTEMS EMPLOYING CANDLE FILTERS

U.S. GOVERNMENT RIGHTS

The United States Government has rights in this invention pursuant to the employer-employee relationship of the Government to the inventor as a U.S. Department of Energy employee at the Federal Energy Technology Center.

TECHNICAL FIELD

The invention relates to an apparatus that acts as a fail save shut off valve. More specifically, the invention relates to a fail save shut off valve that allows fluid flow during normal operational conditions, but prevents the flow of fluids in the event of a system failure upstream that causes over-pressurization. The present invention is particularly well suited for use in conjunction with a hot gas filtering system. Used in such a filtering system, the present invention stops the flow of hot flue gas in the event that a ceramic filter element breaks and pressure increases beyond a critical point.

BACKGROUND OF THE INVENTION

Ball valves are utilized in a variety of different applications including acting as check valves in excess flow situations.

A typical shut off ball valve assembly is found in Gute, U.S. Pat. No. 5,107,890. Gute teaches a check valve having a body member, conical spring, check ball and valve seat, including a coined seating surface to reduce leakage. Other typical ball valve assemblies can be found in Holt, U.S. Pat. No. 4,830,046 and Peters, U.S. Pat. No. 4,010,770.

The present invention is unique in both is design and its function. The present invention allows control of fluid flow without the use of the springs taught in other check valves. In place of springs, the present invention employs a series of by-pass ports that allow the flow of fluids during normal operating flow rates while preventing the flow of fluids beyond a predetermined threshold flow rate.

One embodiment of the present invention incorporates the by-pass ports as part of one central aperture. This simplicity of design allows one to control fluid flow without the springs and multiple apertures taught by previous inventions.

Furthermore, the present invention was specially designed to be used in conjunction with hot gas filtering systems, where ceramic candle filters are used. Many candle filters found in hot gas systems are constructed of brittle ceramic materials that easily break apart and allow particulate laden hot gas to enter the clean side of the filtering system. No previous ball valve has been specifically designed for use in conjunction with a hot gas filtering system that utilizes a ceramic filter.

There is need for a device that is specifically designed to shut off gas flow and prevent contamination of hot gas filtering systems, in the event that a ceramic candle filter breaks.

OBJECTS OF THE INVENTION

An object of the invention is to provide a fail save valve which prevents the flow of fluid through the valve in the event that fluid flow exceeds a threshold amount;

Another object of the invention is to provide a fail save valve which allows fluid flow during normal flow rates but prevents fluid flow during over-pressurization;

Another object of the invention is to provide a fail save valve which prevents the flow of hot gas emanating from a filtering system in the event of a broken ceramic candle filter.

DETAILED DESCRIPTION OF THE PREFERRED EMBODIMENTS

Figure 1:
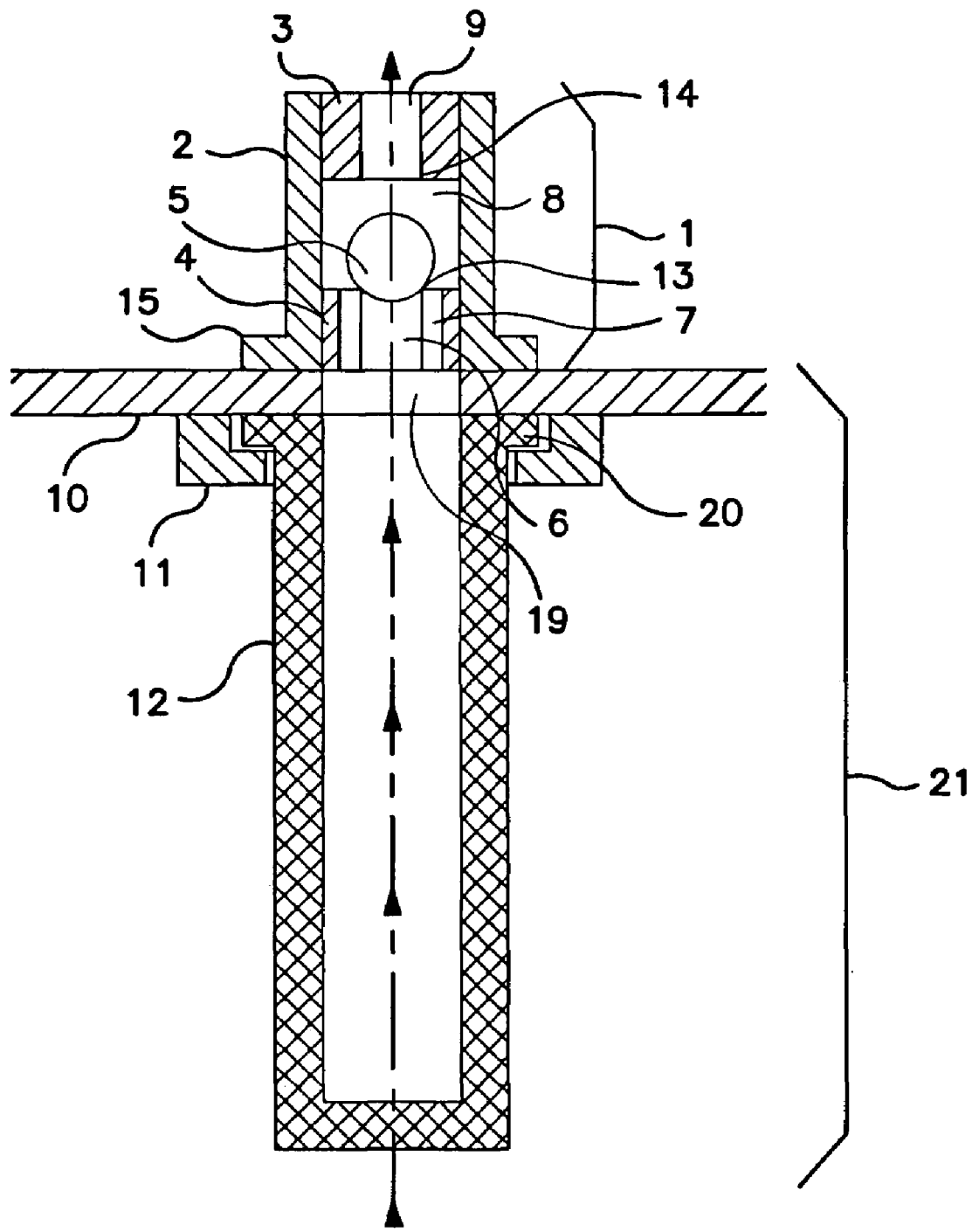
FIG. 1 is a cross-sectional view of the present invention in conjunction with a ceramic filtering apparatus.

FIG. 1 illustrates a schematic view of the preferred embodiment of a fail save shut off valve in conjunction with a hot gas filtering system. The valve assembly 1 consists of a body member 2, a check ball 5, an upper stop 3 and a lower stop 4. The body member 2 is generally cylindrical in shape and has an upper end and a lower end. The body member 2 further has a central cavity 8 that runs the length of the member 2 and allows fluid to pass through the body member 2. (see, FIG. 1) The body member 2 is constructed of stainless steel, plastic or similar resilient material. The lower end of the body member 2 has a flange 15. The flange 15 allows easier attachment of the valve apparatus 1 to the system in which it is employed. (see, FIG. 1).

The check ball 5 is housed within the central cavity 8 of the body member. The check ball 5 is constructed of stainless steel, plastic or similar resilient material. (details of the check ball 5 are discussed later) (see FIG. 1).

The lower stop 4 has a cylindrical shape and is constructed of stainless steel, plastic or similar resilient material. The lower stop 4 has a first and second end. The lower stop 4 is positioned within the lower section of the body member's central cavity 8 as shown in FIG. 1. The lower stop 4 is connected to the body member 2 using screws, adhesive or other coupling devices or material. (see, FIG. 1).

Figure 2A:
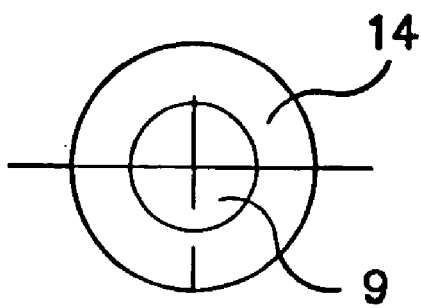
FIG. 2A is top view of the upper stop of the present invention.
Figure 2B:
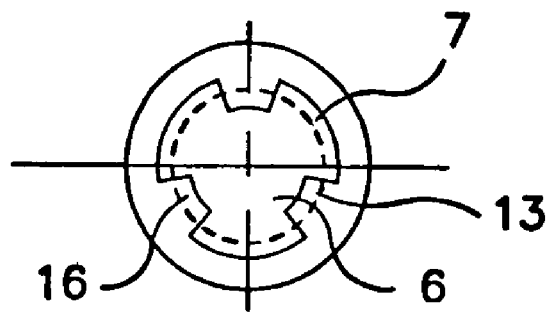
FIG. 2B is a top view of the lower stop of the present invention.
Figure 2C:
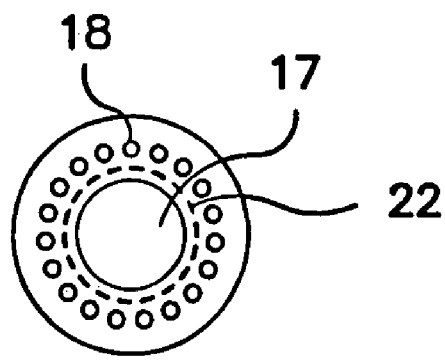
FIG. 2C is a top view of an alternate embodiment of the lower stop of the present invention.

The lower stop 4 has a central aperture 6 that runs the length of the lower stop 4. (see, FIG. 1) The central aperture 6 allows fluid to flow through the lower stop 4. The central aperture 6 is machined to look like FIG. 2C. The aperture 6 is generally circular in shape, except that it is interrupted by series of pie shaped by-pass ports 7 (cut out of the outer edge of the central aperture 6) which are spaced equidistant from each other. (FIG. 2B) The by-pass 7 ports allow fluid to flow around the check ball 5, when the ball 5 is seated upon the lower stop 4. Three by-pass ports are illustrated in FIG. 2C but the number of by-pass can be varied.

The spaces between the by-pass ports 7 form a series of arms 16. The upper surface of arms 16 define a lower seat 13 for the check ball as shown in FIG. 2C. Although a series of 3 arms were used in the present embodiment a number of different configurations could be used without departing from the spirit of the present invention.

Figure 3A:
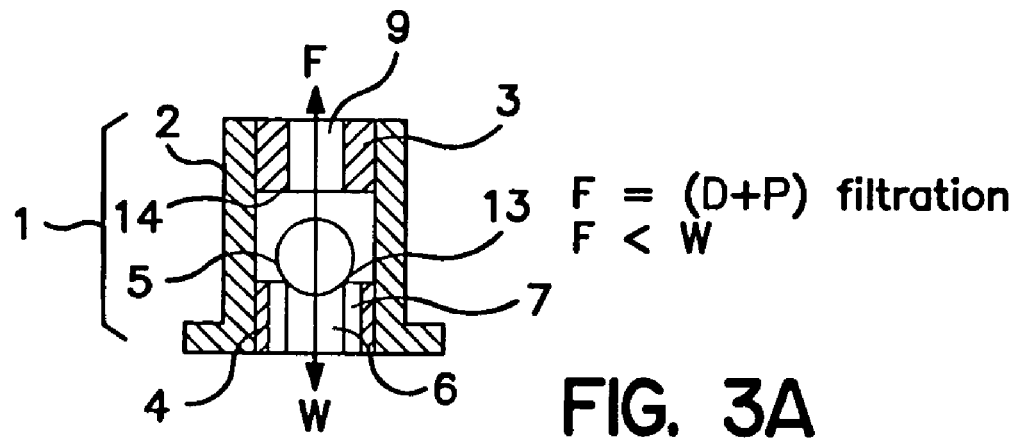
FIG. 3A is a sectional view of the valve apparatus during normal flow situations.

During normal flow rates, the check ball 5 rests the lower seat 13. (see, FIG. 3A) While the ball 5 is seated on the lower seat 13, the ball 5 covers the central portion of the lower seat's central aperture 6 preventing fluid from flowing through the central portion of the aperture 6. The ball 5 remains seated on the lower seat 13, during normal flow rates because the by-pass ports 7 allow enough fluid to pass around the ball 5 to keep the level of drag+pressure forces exerted upward on the ball 5 less than the weight of the ball 5. (see, FIG. 3A) During normal operation the direction of flow is upwards from the lower stop 4, up through the by-pass ports 7, through the central cavity 8, and out through the aperture of the upper stop 9 (to be discussed later). (see, FIG. 1).

In an alternate embodiment of the present invention the lower stop 4 has a central aperture 17 (circular in shape) whose diameter is less than that of the check ball 5. (see FIG. 2C) The surface of the first end of the lower stop 4 (surrounding the central aperture) defines a lower ball seat 22. The lower stop 4 further consists of a series of small apertures 18 that are spaced around the central aperture 17. These apertures 18 must be of sufficient size and number to allow enough fluid to pass through the valve 1 to keep the level of secondary drag+pressure forces exerted upward on the ball 5 less than the weight of ball 5 during normal operation.

The valve apparatus 1 further consists of a upper stop 3 that has a cylindrical shape and is constructed of stainless steel, plastic or similar resilient material. (see, FIG. 1) The upper stop 3 is positioned within the upper section of the body member's central cavity 8 as shown in FIG. 1. The upper stop 3 is connected to the body member 2 using screws, adhesive or other coupling devices or material. The upper stop 3 has a central aperture 9 that runs the length of the upper stop 3 and whose diameter is less than that of the check ball 5.

Figure 3B:
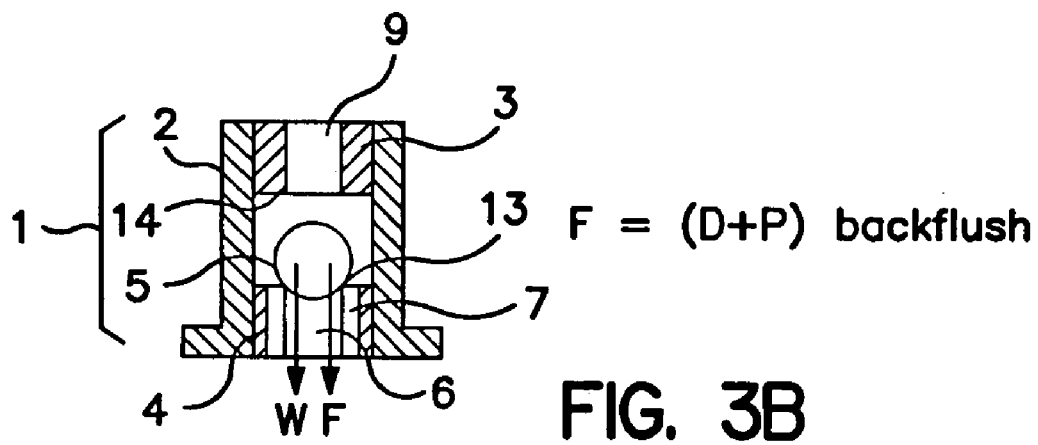
FIG. 3B is a sectional view of the valve apparatus during backflush situations.
Figure 3C:
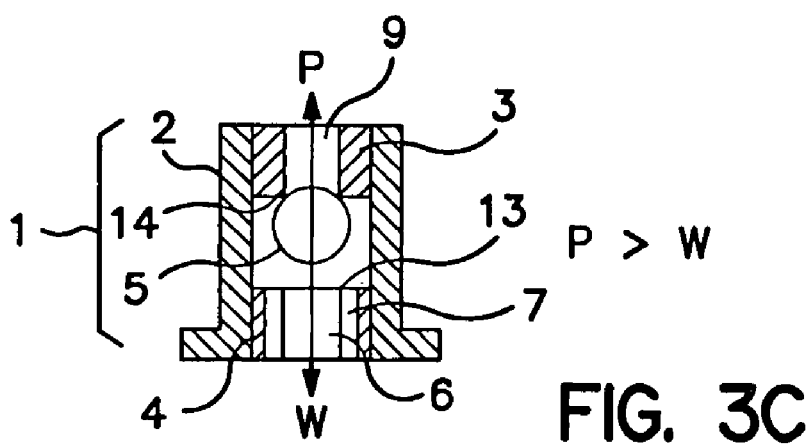
FIG. 3C is a sectional view of the valve apparatus during over-pressurization situations.

The surface of the first end of upper stop (surrounding the central aperture 9) defines an upper ball seat 14. When the flow rate of the fluid increases beyond a threshold level (the threshold level is reached when the upward forces exerted on the check ball 5 from drag and pressure forces is greater than the weight of the check ball 5) the check ball 5 is forced against the upper ball seat 14. (see, FIG. 3C) When the check ball 5 is forced against the upper seat 14, the ball 5 covers the upper aperture 9 and the fluid flow through the valve apparatus 1 is effectively shut off. (see, FIG. 3C).

The weight of the check ball 5 is critical to proper operation of the present invention. The weight of the check ball 5 should correspond to a predetermined threshold flow rate (as described earlier) that is set for the system. The weight of the check ball 5 should be greater than the drag and pressure forces (pushing upward) during normal flow ranges. (see, FIG. 3A) The weight of the ball 5 should be less than predetermined drag and pressure forces that occur during the flow ranges one wishes to prevent. (see, FIG. 3C).

During back-flush operation, fluids flow backward through the valve (in a downward direction from the upper stop 3, through the central cavity 8 and out through the by-pass ports 7) and the fluid will exert drag and pressure forces on the ball 5 in a downward direction, the same direction of the weight of the ball 5. (see, FIG. 3B) Therefore, in back-flush situations, the above forces (drag, fluid pressure and weight) will keep the ball 5 seated upon the lower seat 4 and fluid will be forced through the by-pass ports 7 (or apertures in the alternate embodiment).

It is important to note that orientation is critical to proper operation of the valve 1. The valve assembly 1 must be vertically oriented in relation to the ground, otherwise the valve 1 will not function as intended.

The present invention was designed to work in conjunction with hot gas filtering systems, especially those which utilize ceramic candle filters. As mentioned earlier, ceramic candle filters are very brittle and are known to break apart into several pieces. When a filter breaks, ceramic particles, dirt, and other contaminates pass through the filtering system and contaminate the otherwise particulate-free air. The present invention prevents any such particulate laden gas from entering the clean side of the filtering system by shutting off the flow of gas through the valve.

FIG. 1 illustrates a schematic view of the preferred embodiment of the invention in use in conjunction with a candle filter system 21. The candle filter system consists 21 of a tube sheet 10, candle filter holder 11, and candle filter 12. The tube sheet 10 is a sheet of stainless steel, plastic or similar resilient material having multiple apertures 19. The size of the apertures 19 should correspond to the size of the lower stop's aperture 6. The tube sheet 10 has an upper and lower end. The flange 15 of the lower end of the valve body is attached to the upper end of the tube sheet 10 using a screw, adhesive or other coupling device or material. The valve body 2 is positioned along the tube sheet so that central aperture of the lower stop 6 is aligned with an aperture 19 in the tube sheet 10. This orientation allow fluids to flow through the tube sheet 10 and into the valve 1. (see, FIG. 1).

The candle filter 12 is a ceramic candle filter known in the art for use in hot gas filtering systems. The candle filter 12 has and upper and lower end. The upper end of the filter terminates in a flange 20.

A set of L-shaped members are fastened to the tube sheet and act as a candle filter holder 11. The L-shaped members that make up the candle filter holder 11 are made of stainless steel, plastic or similar resilient material. The L-shaped members are positioned on opposite sides of the tube sheet aperture 19 (with the L portion of their clamp facing toward the aperture) and are attached to the lower end of the sheet 10 by using a screw, adhesive or other coupling device or material. The candle filter holder 11 slideably receives the flange 20 of the upper end of the filter and holds the filter 12 in place so that the filter 12 is aligned with the hole in tube sheet 10 and the valve apparatus 1. This configuration allows fluids to flow through the filter 12, up through the tube sheet 10 and into the valve apparatus 1.

When the candle filter 12 breaks, excess gas is allowed into the candle filter system 21 and pressure within the system increases. This increased gas pressure continues upward into the valve assembly 1. If the pressure in the valve assembly 1 becomes greater than the threshold flow rate set for the system, the pressure will lift the check ball 5 off the lower seat 13 (22 of the alternate embodiment) and upward until the check ball 5 rests upon the upper seat 14, covering the upper stop's central aperture 9 and effectively shutting off air flow through the valve assembly 1. Shutting off the air flow prevents any particulate laden gas to travel into the clean side of the filtering system 21.

While the above provides a description of the preferred embodiments, it should be understood that the present invention can be modified, varied and altered without deviating from the scope of the following claims.

I claim:

1. A ball valve comprising:
   a check ball;

a body member having an upper end and a lower end, the body member further having a central cavity, the cavity having an upper end and a lower end, the central cavity housing the check ball;

an upper ball stop having a first end and a second end, the upper ball stop being positioned within, and attached to, the upper end of the body member's central cavity, the upper ball stop further having a circular central aperture that runs the length of the upper ball stop, the circular aperture of the upper ball stop having a specified diameter, the diameter of the aperture of the upper ball stop being smaller than the diameter of the check ball, the central aperture of the upper stop allowing fluid to flow through the upper stop, the surface of the first end of the upper ball stop defining an upper seat that receives the check ball;

a lower ball stop having a first and second end, the lower ball stop being positioned within, and attached to, the lower end of the body member's central cavity, the lower ball stop having a central aperture running the length of the lower ball stop, wherein the surface of the first end of the lower ball stop forms a series of arms that protrude into the central aperture of the lower stop, the arms defining a lower seat that receives the check ball, the arms being spaced equidistant from each other forming gaps in between the arms, the gaps in between the arms defining a series of by-pass ports, the by-pass ports allowing fluid to flow around the check ball when the check ball is seated upon the lower seat;

a tube sheet, the tube sheet having a first end and second end, the tube sheet further having a series of apertures, the tube sheet's apertures being the same size as the aperture of the lower ball stop, the lower end of the body member being attached to the first end of the tube sheet wherein the lower ball stop's central aperture is aligned with one of the tube sheet's apertures;

a filter having a first and second end, a filter holder, the filter holder being attached to the second end of the tube sheet so that the filter holder is aligned with one of the tube sheet's apertures, the filter holder receiving the first end of the filter so that the filter is aligned with one of the tube sheet's apertures.

2. A ball valve according to claim 1, wherein the lower end of the body member has an lower flange.

3. The ball valve according to claim 1, wherein the filter is a ceramic candle filter known in the art.

4. The ball valve according to claim 1, wherein the first end of the filter has a flange.

5. The ball valve according to claim 1, wherein the filter holder is comprised of two L shaped members.

6. A ball valve according to claim 1, wherein the check ball's weight is greater than the drag and pressure forces pushing upward on the check ball during normal flow, keeping the check ball resting upon the lower seat.

7. A ball valve according to claim 1, wherein the check ball's weight is less than the drag and pressure forces pushing upward on the check ball during over-pressurization situations, forcing the check ball upwards causing the check ball to rest against the upper stop and effectively shutting off the flow of fluid through the valve.

8. A ball valve according to claim 1, wherein the valve is a two-way valve capable of back-flush operation.

* * * * *